Figure 1:
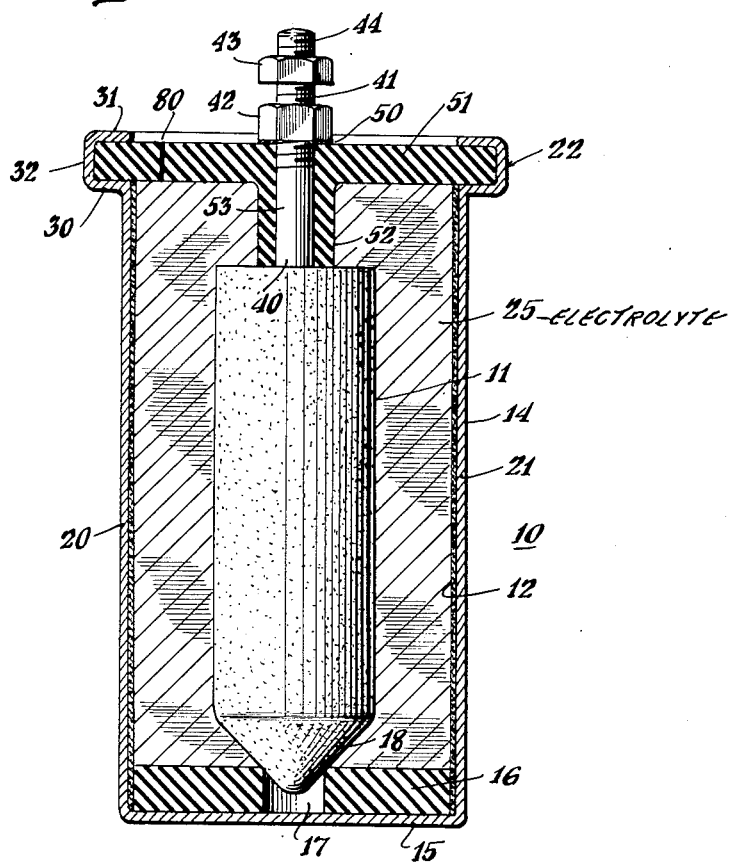

Nov. 4, 1952

J. M. BOOE 2,616,953

ELECTROLYTIC CONDENSER

Filed July 30, 1949

INVENTOR.
James M. Booe
BY
Nicholas Lange
ATTORNEY

Patented Nov. 4, 1952

2,616,953

UNITED STATES PATENT OFFICE 2,616,953

ELECTROLYTIC CONDENSER

James M. Booe, Indianapolis, Ind., assignor to P. R. Mallory & Co., Inc., Indianapolis, Ind., a corporation of Delaware Application July 30, 1949, Serial No. 107,789

8 Claims. (Cl. 175—315)

1

This invention relates generally to electrolytic devices and has specific application to such devices including means and methods for manufacturing the individual components therefor.

Electrolytic devices embodying the invention may be advantageously employed in the form of electrolytic capacitors, or such, and includes an electrolyte which makes contact with a set of electrodes, one of which, commonly designated as an anode, comprises a body of metal adapted to have formed thereon a film whose function it is to act as the dielectric for the capacitor. The set of electrodes are, in the usual case, immersed within a suitable electrolyte determined by the metallic nature and structure of the electrodes.

The amount of capacitance and the efficiency of the capacitor, depends to a great extent in maintaining one of the electrodes, usually the cathode, free of dielectric film forming tendencies, since such a film formed on the cathode tends to decrease the capacity of the capacitor and lessen the efficiency thereof.

By the present invention an electrolytic capacitor is provided having a non-polarizable cathode electrode and possessing the electrical characteristics of a substantially perfect cathode. That is to say, the hereinafter described cathode utilized as an electrode for an electrolytic capacitor is substantially non-film forming, non-gassing and offers a minimum internal series resistance so as to give optimum operation of the capacitor.

This great advance in the electrolytic art is based upon the discovery that such an electrode may be obtained by utilizing a metal which is substantially chemically inert to the capacitor electrolyte but which can respond electrochemically to the flow of pulsating current through the electrolytic cell. It is found that the electrochemical response is obtained by dissolving the cathode metal during one part of a current cycle and redepositing the same metal ions from the electrolyte on to the cathode during another part of the current cycle. Capacitors constructed in accordance with this far reaching principle are free from the usual effect of capacitance in series as is the result when a film forming cathode is employed. These capacitors are also found to be free from the effect of gas evolution at the cathode developed by the use of strictly inert cathode materials.

It is, therefore, an object of the present invention to provide a novel electrolytic cell or capacitor adapted to operate over a wide ambient range of temperatures.

Still another object of the present invention is

2 to provide an electrolytic capacitor adapted for use in extreme ranges of heat and cold, for examble, from —60° C. to 200° C.

Another object of the present invention is to provide a new type of capacitor embodying the constructional features of a substantially perfect cathode exhibiting non-gassing and non-film forming tendencies.

Still another object of the present invention is to provide an electrolytic capacitor having a non-polarizable cathode possessing the electrical characteristics of a substantially perfect cathode.

Yet another object of the present invention is to provide in a capacitor an electrode which in the absence of a potential difference may remain chemically inert within its associated electrolyte, yet, may respond electrochemically to the flow of pulsating current therethrough.

Still another object of the present invention is to provide an electrolytic capacitor adapted for use over a wide range of temperatures and which includes an anode fabricated of tantalum metal and a non-polarizable cathode fabricated of metal of the class including silver and copper.

The invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in connection with the accompanying figures of the drawing and wherein like reference characters describe elements of similar function therein and wherein the scope of the invention is determined rather from the dependent claims.

Figure 2:
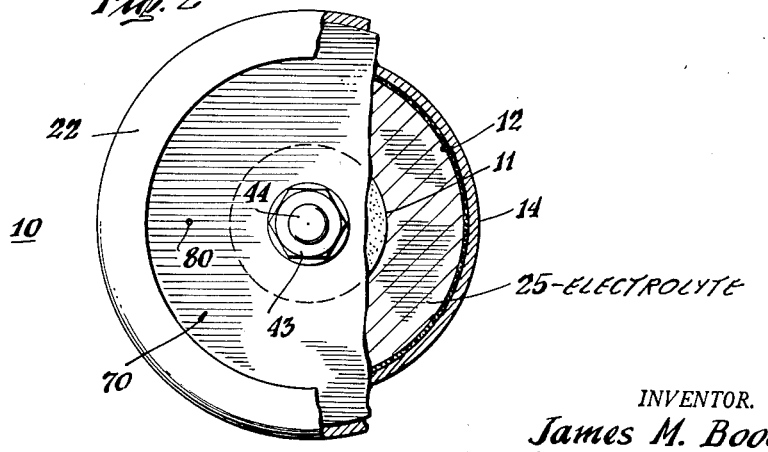

For illustrative purposes the invention will be described in connection with the accompanying drawing in which:

Figure 1 represents a vertical cross sectional elevational view of an enlarged scale of an electrolytic capacitor embodying the present invention; and Figure 2 represents a top elevational view having a portion thereof broken away, of the electrolytic capacitor of the above embodiment of the invention as shown in Figure 1 thereof.

Generally speaking, the present invention describes a novel type of electrolytic cell or capacitor including a non-polarizable cathode fabricated of a metal selected from the group of copper and silver cooperatively operating with a tantalum anode immersed in an electrolyte, for example, sulphuric acid.

Electrolytic cells or capacitors constructed in accordance with the present invention may be adapted for use in polarized circuits and are able to accompany an alternating current component flowing therethrough in such manner as to store additional energy at the anode surface during the increasing voltage phase of the pulsating component and are enabled thereafter to dissipate this energy back to the circuit during the receding voltage phase of the pulsating current component.

Since at one time the cathode included in the electrolytic cell reacts with the electrolyte so as to dissolve metal ions therein with metal ions being reabsorbed by the cathode during the increasing voltage phase of the electric current, such electrochemical action at the cathode may be suitably termed "oscillating" and a cathode functioning in accordance therewith and in cooperation with a determined electrolyte may be termed "an oscillating cathode."

Referring now to the figures of the drawing which illustrate an embodiment of the invention, there is shown an electrolytic capacitor generally designated by reference number 10. Capacitor 10 has an electrode 11 which may be fabricated of tantalum, preferably of porous tantalum metal formed of tantalum particles pressed and sintered by powdered metallurgical procedures, and which herein is adapted to be used as an anode having a great surface area. A second electrode adapted to act as a cathode 12 of cell 10 is positioned within a cell at a distance preferably substantially equidistant from anode 11 so as to obtain equal electrochemical activity therebetween. Cell or capacitor 10 may have as its container a can 14, here shown as being a shell having cylindrical shape, but which shape is not to be taken as being definitive of the configuration thereof. Container 14 may be constructed of a metal, for example, copper and has a non-porous plating of a metal, herein described and shown as being silver, formed on the inside of, nominally, side walls 20 and 21 thereof.

At the bottom wall 15 of container 14 there is positioned rubber insert 16 which is adapted to locate or anchor anode 11 within a bore or opening 17 thereof as by means of a tapered tip section 18 of anode 11. The top of container 14 is formed of an annular C-shaped collar 22 comprising horizontal parallel wall and lip sections 30 and 31 respectively, which sections extend in an outward direction from the side walls and are interconnected by means of vertical side wall section 32. Between anode 11 and its associated cathode 12 there is interposed an immobilized electrolyte 25 herein stated as being sulphuric acid, and which may be in a gel form. In the gel form a gelling agent is used in the electrolyte which is not adversely affected by the electrolyte, for example, silica gel. This is incorporated into the electrolyte as ethyl silicate which hydrolyzes to a gel of silicic acid.

Tantalum electrode 11 has connected thereto a stem or rod 40 which may be fabricated of tantalum and integrally formed therewith. Rod or stem 40 is threaded at its topmost portion as by means of thread 41 adapted to receive nuts 42 and 43 in a manner as hereinafter described. A tip 44 of rod 40 is adapted to act as an electrode terminal in the operation of the cell. The porous tantalum anode 11 has a threaded stem 40 screwed through the top 70 of container 10 and nuts 42 and 43 are tightened thereupon. A seal preferably of cement 50 is made between nut 42 and the top of the container. The top or cover 70 of the container comprises an annular T-shaped stopper having a top annular section 51 made, for example, of hard rubber and is intimately contained by collar 22 on extension 30 as by means of lip 31 thereof. Integrally connected to hard rubber section 51 is a rubber washer seal 52 which substantially circumscribes section 53 of tantalum stem 40. A vent 80 adapetd for use in the cell as a pressure escapement valve is formed to penetrate cover 70 so that beyond a predetermined pressure, excessive pressures may be released externally from the cell.

In the operation of the electrolytic capacitor, above described, there is found that on the receding voltage phase of the pulsating current component acting thereon, the metal from the cathode is dissolved in amounts electrochemically equivalent to the amount of current flowing in that phase so as to produce metal ions of the cathode metal in the electrolyte. This electrolyte is immobilized so that the electrolyte retains any dissolved metal at the face of the cathode in such manner that it can be redeposited on the cathode by the leakage current of the cell, whereas, it has been found that if the electrolyte is not immobilized the metal ions from the cathode may be dispersed throughout the electrolyte and may not return to the cathode.

Thus during the increasing phase of the pulsating current component it is found that by the use of an immobilized electrolyte comprising sulphuric acid and distilled water having a specific gravity of approximately 1.25 and saturated with silver sulfate the metal ions of the cathode are redeposited thereupon in amounts electrochemically equivalent to the amount of current flowing during that portion of the current cycle. If necessary, moreover, a layer of dialyzing paper (not shown) may be used to line the inside of the cathode can so as to better retain the dissolved metal next to the cathode.

The described electrolytic capacitor including anodes of a condensed area type, herein shown as being fabricated of tantalum metal has the great advantage of using an "oscillating cathode" whose area is small as compared to the area of the anode. The electrolytic capacitor operates with uniform characteristics and cooperates with the immobilized electrolyte of sulphuric acid in such a manner that an asymmetrical conducting film is not formed on the cathode; and further the cathode does not suffer any undue chemical attack by the electrolyte but normally remains substantially inert with reference thereto. Further in the operation of the present electrolytic capacitor any non-conducting corrosion products of the cell do not accumulate on the cathode and such gases as oxygen and hydrogen are not liberated at the cathode due to the flow of pulsating electric current.

The described present novel electrolytic capacitor operating over wide ranges of temperature, including extremes of heat and cold, is intended to be merely illustrative and not exhaustive and since many changes could be made herein without departing from the scope of the invention, it is intended that these changes be included herein and to be covered by the appended claims.

What is claimed is:

1. An electrolytic capacitor adapted for use over wide temperature ranges comprising in combination an anode fabricated of porous tantalum metal having a dielectric film formed thereupon, a cathode of silver, and an electrolyte of sulphuric acid therebetween and making contact with said anode and cathode.

2. An electrolytic capacitor adapted for use over a wide range of temperatures comprising in combination an anode fabricated of porous tantalum metal having a dielectric film formed thereon, an electrolyte of sulphuric acid saturated with silver sulfate in contact with said anode, and a second electrode fabricated of silver inserted within said electrolyte and adapted to remain chemically inert therewithin.

3. An electrolytic capacitor adapted to operate over a wide range of temperatures comprising in combination an anode fabricated of tantalum metal adapted to form a film dielectric thereupon, a second non-polarizable silver electrode, and a gel electrolyte of sulphuric acid containing silver sulphate interposed between said anode and electrode and making contact therewith.

4. An electrolytic capacitor adapted for use over a wide temperature range comprising in combination an anode fabricated of tantalum metal adapted to form a film of dielectric thereon, a non-polarizable cathode fabricated of silver, and a gel electrolyte of sulphuric acid in contact with and contiguously interposed therebetween.

5. An electrolytic capacitor comprising, in combination, an anode of tantalum having a dielectric film thereon, a cathode of silver, and an electrolyte of sulphuric acid interposed between and in contact with said anode and cathode, said silver cathode being capable of responding to the flow of current through the capacitor in one direction by the dissolution of silver in the electrolyte and of responding to the flow of current through the capacitor in the opposite direction by the deposition of silver from the electrolyte.

6. An electrolytic capacitor comprising, in combination, an anode of porous tantalum having a dielectric film formed thereon, a cathode of silver, and an electrolyte of sulphuric acid containing silver sulfate in appreciable amounts interposed between and in contact with said anode and cathode, said silver cathode being capable of responding to the flow of current through the capacitor in one direction by the dissolution of silver in the electrolyte and of responding to the flow of current through the capacitor in the opposite direction by the deposition of silver from the electrolyte.

7. An electrolytic capacitor comprising, in combination, an anode of porous tantalum having a dielectric film formed thereon, a cathode of silver, and an electrolyte of sulphuric acid substantially saturated with silver sulfate interposed between and in contact with said anode and cathode, said silver cathode being capable of responding to the flow of current through the capacitor in one direction by the dissolution of silver in the electrolyte and of responding to the flow of current through the capacitor in the opposite direction by the deposition of silver from the electrolyte.

8. An electrolytic capacitor comprising, in combination, an anode of tantalum having a dielectric film thereon, a cathode of silver, and an electrolyte of sulphuric acid containing ions of the cathode metal interposed between and in contact with said anode and said cathode, said cathode being non-film forming and non-polarizing in an normally chemically inert to the electrolyte but being capable of responding to the flow of current through the capacitor in one direction by the dissolution of silver in the electrolyte and of responding to the flow of current through the capacitor in the opposite direction by the deposition of silver from the electrolyte in amounts electrochemically equivalent to the amount of current flowing through the capacitor.

JAMES M. BOOE.

REFERENCES CITED

The following references are of record in the file of this patent:

UNITED STATES PATENTS

| Number | Name | Date |
|---|---|---|
| 1,866,604 | Siegmund | July 12, 1932 |
| 2,051,592 | Craine | Aug. 18, 1936 |
| 2,060,022 | Brennan | Nov. 10, 1936 |
| 2,104,019 | Brennan | Jan. 4, 1938 |
| 2,359,970 | Clark | Oct. 10, 1944 |

FOREIGN PATENTS

| Number | Country | Date |
|---|---|---|
| 646,749 | France | Nov. 15, 1928 |
| 355,965 | Great Britain | Sept. 3, 1931 |